(12) United States Patent
Bondurant

(10) Patent No.: US 11,495,912 B2
(45) Date of Patent: Nov. 8, 2022

(54) CHARGING CONNECTOR FOR ORAL HEALTH DEVICES

(71) Applicant: WATER PIK, INC., Fort Collins, CO (US)

(72) Inventor: Thomas A. Bondurant, Fort Collins, CO (US)

(73) Assignee: WATER PIK, INC., Fort Collins, CO (US)

( * ) Notice: Subject to any disclaimer, the term of this patent is extended or adjusted under 35 U.S.C. 154(b) by 308 days.

(21) Appl. No.: 16/846,079

(22) Filed: Apr. 10, 2020

(65) Prior Publication Data

US 2021/0320455 A1 Oct. 14, 2021

(51) Int. Cl.
*H01R 13/62* (2006.01)
*H02J 7/00* (2006.01)
*A61C 17/02* (2006.01)

(52) U.S. Cl.
CPC ........ *H01R 13/6205* (2013.01); *H02J 7/0042* (2013.01); *A61C 17/0202* (2013.01)

(58) Field of Classification Search
CPC ... H01R 3/6205; H02J 7/0042; A61C 17/0202
See application file for complete search history.

(56) References Cited

U.S. PATENT DOCUMENTS

| | | |
|---|---|---|
| 3,810,258 A | 5/1974 | Mathauser |
| 5,873,737 A | 2/1999 | Hashizawa et al. |
| 6,478,614 B1 | 11/2002 | De'Longhi |
| 6,527,570 B1 | 3/2003 | Hailman et al. |
| 7,416,414 B2 | 8/2008 | Bozzone et al. |
| 7,637,746 B2 | 12/2009 | Lindberg et al. |
| 8,651,876 B2 | 2/2014 | Mysliwiec et al. |
| 8,734,165 B2 | 5/2014 | Neel |
| 8,894,419 B1 * | 11/2014 | Buelow ................. H02J 7/0045 439/39 |
| 9,112,304 B2 | 8/2015 | Rohrbach et al. |
| 9,478,901 B2 | 10/2016 | Chen et al. |
| 9,496,642 B1 | 11/2016 | Fan |
| 10,003,880 B2 | 6/2018 | Wagman et al. |
| 2005/0082915 A1 | 4/2005 | Steinberg |
| 2016/0064859 A1 * | 3/2016 | Barak .................. H01R 13/633 439/480 |
| 2016/0190736 A1 | 6/2016 | Chun et al. |

(Continued)

FOREIGN PATENT DOCUMENTS

| | | |
|---|---|---|
| CN | 202423707 U | 9/2012 |
| CN | 203589347 U | 5/2014 |
| CN | 204441603 U | 7/2015 |

*Primary Examiner* — Sunita Joshi
(74) *Attorney, Agent, or Firm* — Dorsey & Whitney LLP

(57) ABSTRACT

In one embodiment, a charging connector for charging devices, such as oral health devices, is disclosed. The charging connector may include a cable configured to connect to a power source and a plug in electrical communication with the cable and configured to connect to a device. The plug includes a plug body, a first conductive contact in electrical communication with the cable, a second conductive contact in electrical communication with the cable, a first magnetic element aligned with the first conductive contact and having a first polarity, and a second magnetic element aligned with the second conductive contact and having a second polarity that is different from the first polarity.

19 Claims, 5 Drawing Sheets

(56) References Cited

U.S. PATENT DOCUMENTS

| | | |
|---|---|---|
| 2016/0254616 A1 | 9/2016 | Kim et al. |
| 2017/0018863 A1 | 1/2017 | Gao et al. |
| 2017/0068276 A1 | 3/2017 | Wagman et al. |
| 2017/0093087 A1 | 3/2017 | Esmaeili et al. |

* cited by examiner

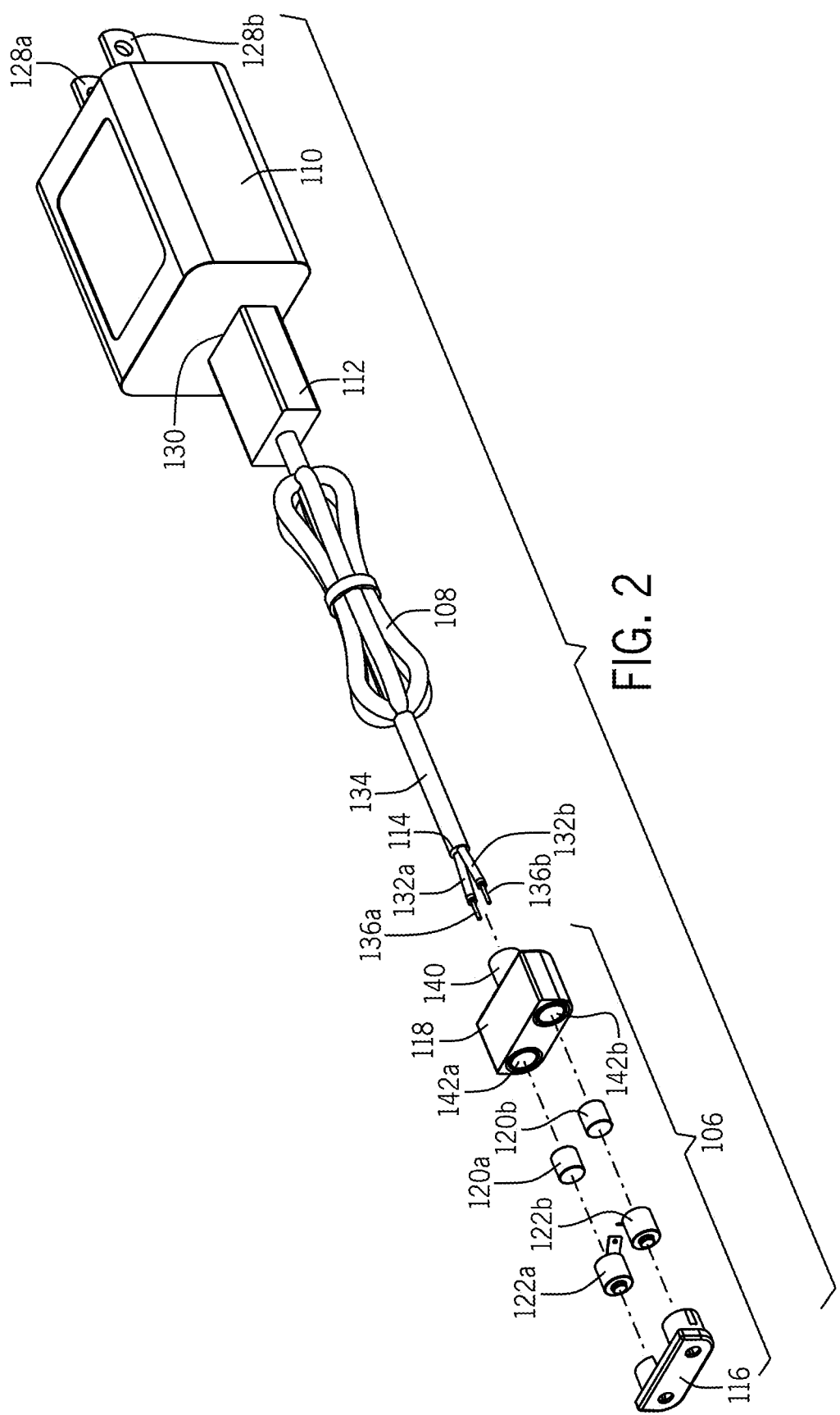

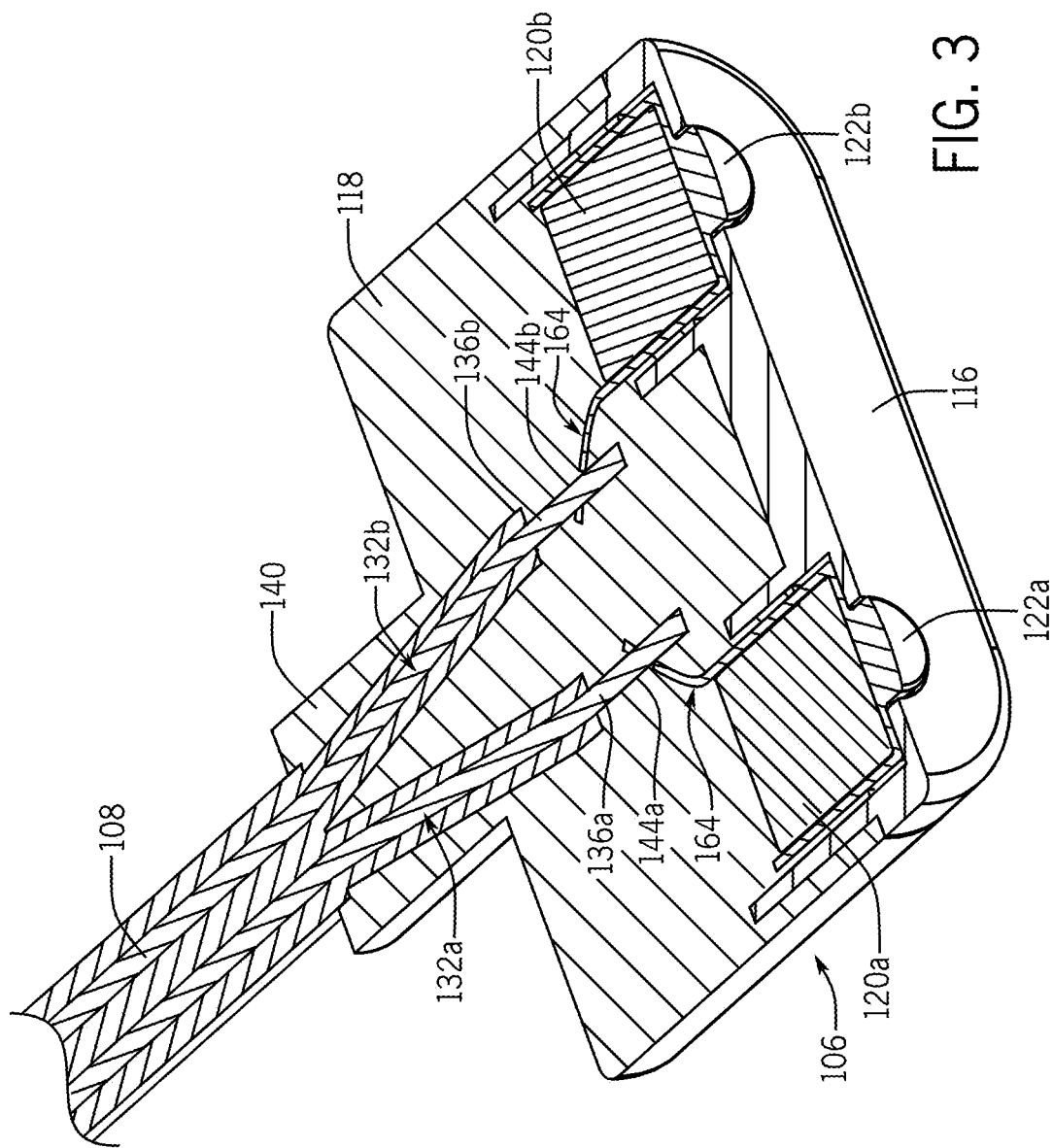

CHARGING CONNECTOR FOR ORAL HEALTH DEVICES

TECHNICAL FIELD

One or more embodiments of the present disclosure relate generally to charging connectors and other electrical connectors, such as charging cords and connectors for oral health devices.

BACKGROUND

Oral health devices, such as electric toothbrushes, oral irrigators, and combination units, often require a power source in order to power a motor to activate a brush motion and/or pump for fluid expulsion. Conventional oral health devices typically include a permanent cord attachment that connects to the motor and enables a connection to a power source, such as a wall outlet. Such permanent cord attachments make the devices less portable and compact, as the cord typically extends outside of the device. Therefore, there is the need for a detachable connector that can be used to electrically connect an oral health device to a power source, such as a wall outlet or battery, as well as to other devices.

SUMMARY

According to one or more embodiments of the present disclosure, a charging connector is disclosed. The charging connector includes a cable configured to connect to a power source and a plug in electrical communication with the cable and configured to connect to a device. The plug includes a first conductive contact in electrical communication with the cable, a second conductive contact in electrical communication with the cable, a first magnetic element received within the first conductive contact and having a first polarity and a second magnetic element received within the second conductive contact and having a second polarity that is different from the first polarity.

According to one or more embodiments of the present disclosure, a charging assembly for charging a device is disclosed. The charging assembly includes a cable configured to be electrically connected to a power source, the cable including a first wire and a second wire, and a plug connected to the cable. The plug includes a first conductive contact in electrical communication with the first wire, a first magnetic received within the first conductive contact and having a first polarity, a second conductive contact in electrical communication with the second wire, and a second magnetic received within the second conductive contact and having a second polarity.

According to one or more embodiments of the present disclosure, an oral irrigator system is disclosed. The system includes an oral irrigator with a charging port, the charging port including a first conductive contact and a first magnetic element connected to the first conductive contact, and a charging connector releasably connectable to the charging port. The charging connector includes a second conductive contact and a second magnetic element connected to the second conductive contact, where the first magnetic element and the second magnetic element have opposite poles.

Additional features are set forth in part in the description that follows and will become apparent to those skilled in the art upon examination of the specification and drawings or may be learned by the practice of the disclosed subject matter. A further understanding of the nature and advantages of the present disclosure may be realized by reference to the remaining portions of the specification and the drawings, which forms a part of this disclosure.

One of skill in the art will understand that each of the various aspects and features of the disclosure may advantageously be used separately in some instances, or in combination with other aspects and features of the disclosure in other instances. Accordingly, individual aspects can be claimed separately or in combination with other aspects and features. Thus, the present disclosure is merely exemplary in nature and is in no way intended to limit the claimed invention or its applications or uses. It is to be understood that structural and/or logical changes may be made without departing from the spirit and scope of the present disclosure.

The present disclosure is set forth in various levels of detail and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. Moreover, for the purposes of clarity, detailed descriptions of certain features will not be discussed when they would be apparent to those with skill in the art so as not to obscure the description of the present disclosure. The claimed subject matter is not necessarily limited to the arrangements illustrated herein, with the scope of the present disclosure is defined only by the appended claims.

BRIEF DESCRIPTION OF THE DRAWINGS

The description will be more fully understood with reference to the following figures in which components may not be drawn to scale, which are presented as various embodiments of the brush head described herein and should not be construed as a complete depiction of the scope of the brush head.

FIG. 2 is a perspective exploded view of the charging connector.

FIG. 3 is a cross-section of the charging connector taken along line 3-3 in FIG. 1.

Embodiments of the invention and their advantages are best understood by referring to the detailed description that follows. It should be appreciated that like reference numerals are used to identify like elements illustrated in one or more of the figures.

DETAILED DESCRIPTION

According to the present disclosure, a detachable charging connector is disclosed. The charging connector may be used with various types of devices that require electrical power, such as, but not limited to, oral health devices including oral irrigators, electrical toothbrushes, and combination irrigators/brushes, as well as other types of powered consumer products and devices. In some embodiments, the charging connector includes contact elements that act to both connect the charging connector to the respective device, as well as transfer electricity therethrough. In some embodiments, the contact elements include an electrically conductive contact (e.g., metal contact) and a magnetic element. The electrically conductive contact member is able to electrically couple to corresponding elements on the device to transfer current from a power source (e.g., wall outlet) to the device. In some implementations, the conductive contacts may extend outwards from an engagement surface of the charging connector, which may further help a user to visually and haptically align the connector to the device.

The magnetic elements assist in coupling the charging connector to the device. For example, the magnetic elements may be received within a body of the conductive contact, such that the magnetic force will help to pull the charging connector towards corresponding magnetic elements in the device charging port. In some embodiments, the magnetic elements have opposite polarities from each other, assisting a user in orienting the connector properly on the device.

The charging connector may include a plug body. The plug body may connect the conductive contacts, the magnetic elements, the plug face, and the cable together. The plug body may be overmolded onto the conductive contacts, the magnetic elements, the plug face, and the cable, which may reduce the complexity and cost of the charging connector. The plug body may define a user-friendly frictional surface that assists a user in grasping the plug body. In some instances, the plug body may define an integrated strain relief for the connector at the cable location.

Figure 1:
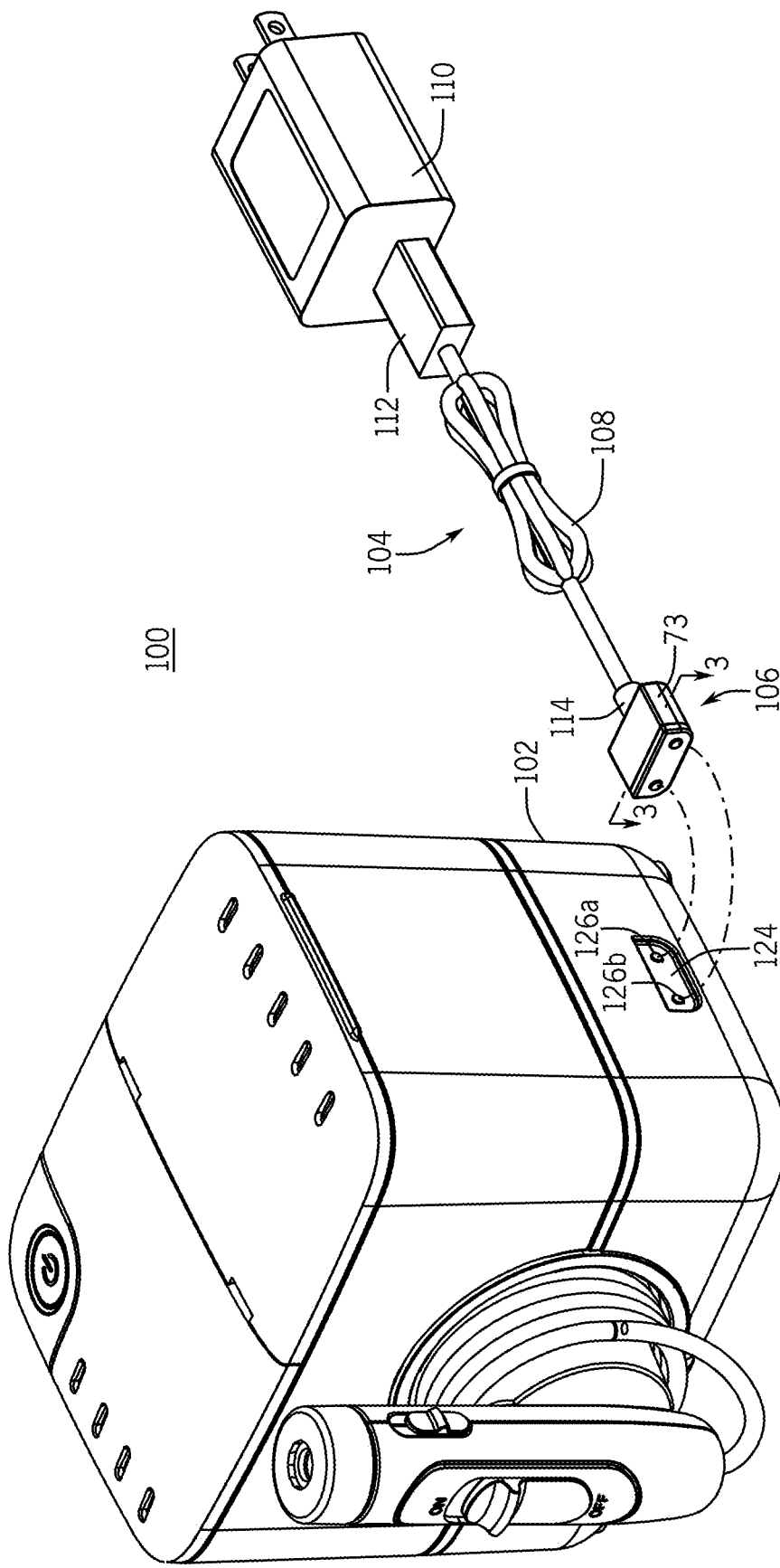
FIG. 1 is a perspective view of an oral health system including an oral health device and a charging connector.

Turning to the figures, FIG. 1 illustrates a perspective view of a charging system 100, including a device 102 and a charging connector 104 for charging the device 102 or otherwise providing power directly to the device 102 (e.g., directly to a motor rather than to a battery). In one example, the device 102 is an oral health device, such as an oral irrigator or toothbrush, but in other embodiments may be any other type of consumer product or device requiring power. In instances where the device 102 is an oral irrigator, the charging connector 104 may provide power to a motor that drives a pump to expel fluid into a user's mouth. In instances where the device 102 is a toothbrush or a combination oral irrigator/brushing device, the charging connector 104 may provide power to a motor that activates a vibration or brush motion (e.g., oscillates a brush head).

The device 102 includes a charging port 124 or other charging location that corresponds to and receives the charging connector 104. For example, as shown in FIG. 1, in this example, the charging port 124 may be defined as a recessed cavity within a sidewall of an outer housing of the device 102. The charging port 124 may include one or more electrical contacts 126a, 126b that when connected to the charging connector 104 complete a circuit to allow the transfer of an electrical current from the charging connector 104 to the corresponding component within the device 102. For example, the electrical contacts 126a, 126b may be electrically connected to a battery, motor, circuit, processing element, or the like, within the device 102, such that once an electrical connection is made with the charging connector 104, the connected internal components within the device 102 receive electrical current. It should be noted that in some instances, the device 102 may include one or more power converters or the like that transform the input power into a desired format or level satisfactory for the device 102. Alternatively, or additionally, the charging connector 104 may include power transformers.

The electrical contacts 126a, 126b of the charging port 124 may be configured to mirror those of the charging connector 104, discussed in more detail below. For example, in some instances, the electrical contacts 126a, 126b may include magnetic elements that exert magnetic forces to assist the charging connector 104 in aligning and connecting to the port 124.

FIG. 2 illustrates an exploded view of the charging connector 104. With reference to FIGS. 1 and 2, the charging connector 104 includes a plug 106. In various embodiments, the charging connector 104 may include a cable 108, a cable connector 112, and a source block 110, all of which may be connected together with the plug 106. In some embodiments, the various components of the charging connector 104 may be releasably connected together, allowing select components to be replaced or disconnected as needed.

The source block 110, which may be a power brick, acts to electrically couple the cable 108 and the plug 106 to an electrical current source, e.g., a wall outlet, battery, or other source. The source block 110 may include two or more connection prongs 128a, 128b (e.g., a pair of prongs) that extend outwards from a surface thereof and are configured to connect to the desired electrical current source. As shown in FIG. 2, in one embodiment the connection prongs 128a, 128b are configured as Type A prongs that connect to North and Central America outlets. Optionally, the source block 110 may include a grounding prong that may be used as a connection to ground. It should be understood that the prongs 128a, 128b may be varied as desired and other types of plug connections are envisioned, including other types of prongs that connect to different types of electrical outlets.

The prongs 128a, 128b are in electrical communication with a source port 130 that defines a connection location for the cable 108. In one example, the source port 130 is formed as a universal serial bus (USB) port, but may be configured in other manners depending on the configuration of the cable 108. The source block 110 may also include a transformer or power adapter that acts to convert the power from the electricity source into a desired format, e.g., convert alternating current (AC) to direct current (DC) and/or step-up or step-down the voltage. The type of source port 130 and transformer or power adapters depend on the type of power utilized by the device 102, as well as the expected power source that the charging connector 104 will be connected to and as such the examples herein are illustrative only.

The cable 108 interconnects the plug 106 to the source block 110 and allows electrical current to be transferred therebetween. In one embodiment, the cable 108 includes one or more electrical wires 132a, 132b, which may include a conductive wire and optionally an insulative sleeve. Additionally, a cable insulator 134 may surround the electrical wires 132a, 132b, as well as act to mechanically couple the wires 132a, 132b together. The cable 108 may include a plug end 114 after which the electrical wires 132a, 132b are exposed such that the conductive ends 136a, 136b of the conductive wire are exposed to be connected to corresponding electrical contacts within the plug 106. The cable 108 includes a cable connector 112 that includes a source end configured to couple to the source port 130. For example, in instances where the source port 130 is a female USB port, the cable connector 112 may include a male USB connector configured to mechanically and electrically connect to the source port 130. As should be understood, the configuration of the cable connector 112 will vary depending on the type of source block 110, as well as a desired connection protocol for the charging connector 104.

FIG. 3 is a cross-section view of the charging connector 104. With reference to FIGS. 2 and 3, the plug 106 of the charging connector 104 may include a plug body 118, a plug face 116, one or more conductive contacts 122a, 122b, and/or one or more magnetic elements 120a, 120b, each of which may be connected together.

The plug body 118 defines a housing or encasement for the plug 106 and acts to house the various plug components. In some instances, the plug body 118 may be defined generally as a trapezoidal or rectangular shape and optionally may include rounded edges as the edges transition downwards and inwards from a top surface to a bottom surface. A strain relief 140 may extend outwards from a back surface of the plug body 118. In some embodiments, the strain relief 140 is integrated with the plug body 118 and may be shaped as a circular member. However, in other embodiments, the strain relief 140 may be configured based on changes of the cable 108 and the plug end 114, e.g., the shape of the strain relief may generally correspond to the shape and diameter of the cable 108.

The plug body 118 may also include one or more internal cavities or recesses to receive various components of the plug 106 and the plug end 114 of the cable 108. For example, the plug body 118 may include conductive cavities 142a, 142b configured to receive the conductive contacts 122a, 122b and the magnetic elements 120a, 120b. In some instances, the conductive cavities 142a, 142b may be formed as generally cylindrical cavities and allow a connection between the conductive contacts 122a, 122b and the cable 108, as discussed in more detail below. The plug body 118 may also include wire pathways 144a, 144b that define a connection path for the plug end 114 conductive ends 136a, 136b to connect with the conductive contacts 122a, 122b.

The plug body 118 may be formed through an overmolding process and the conductive cavities 142a, 142b and the wire pathways 144a, 144b may be formed as the plug body 118 material flows around and over the components during manufacturing. As a specific implementation, the plug body 118 may be formed of a thermoplastic elastomer (TPE) that is overmolded around the plug components and the plug end 114 of the cable 108. In embodiments where the plug body 118 is formed via an overmolding process, the number of components may be reduced, e.g., the plug housing does not need to include two or more press fit components that fit together. This helps to reduce manufacturing costs as well as manufacturing complexity.

The material used for the plug body 118 may be selected to have a rubbery or friction enhancing surface, helping the user to more easily grasp the body 118. For example, as previously mentioned, the plug body 118 may be formed of a friction enhancing material, such as a rubber material (e.g., TPE). In some instances, the plug body 118 may include textured elements (e.g., ribs, ridges, or the like). The plug body 118 may be made of a flexible, but rigid material, which allows the strain relief 140 to resist bending of the cable 108, while the additional coverage of the cable 108 reinforces mechanical strength and electrical integrity of the connection between the cable 108 and the plug 106.

In some embodiments, the plug body 118 may be formed of other materials, e.g., plastic, and include a mechanical closure. For example, in one embodiment, the plug body 118 may be formed of a clamshell housing, including first and second shells that snap or otherwise fit together to enclose the various components of the plug 106. In these instances, the plug face 116 may be formed integrally with the plug body 118 or housing and a separately formed strain relief 140 may be coupled to the cable 108 at the plug end, e.g., as an overmold of TPE that sits adjacent to the plug body 118.

Figure 4A:
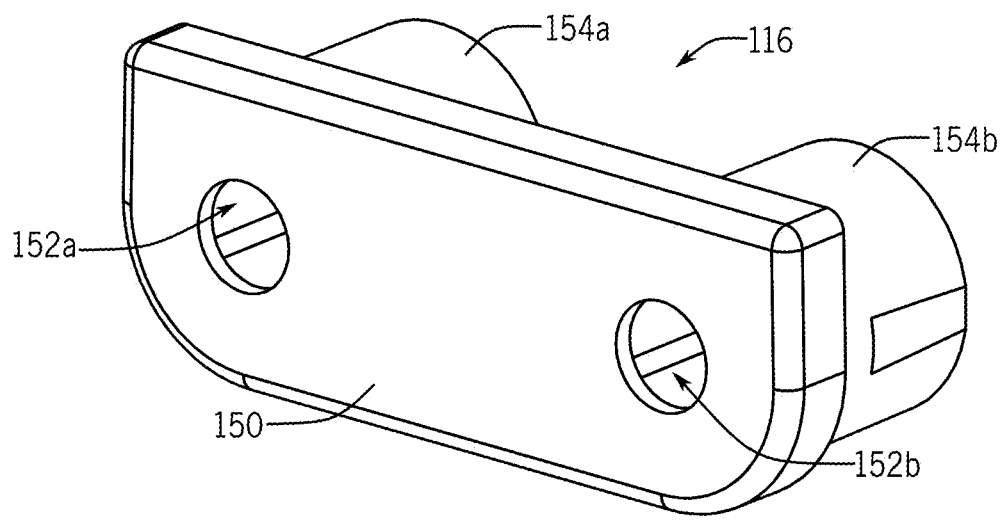
FIG. 4A is a front perspective view of a plug face for the charging connector.
Figure 4B:
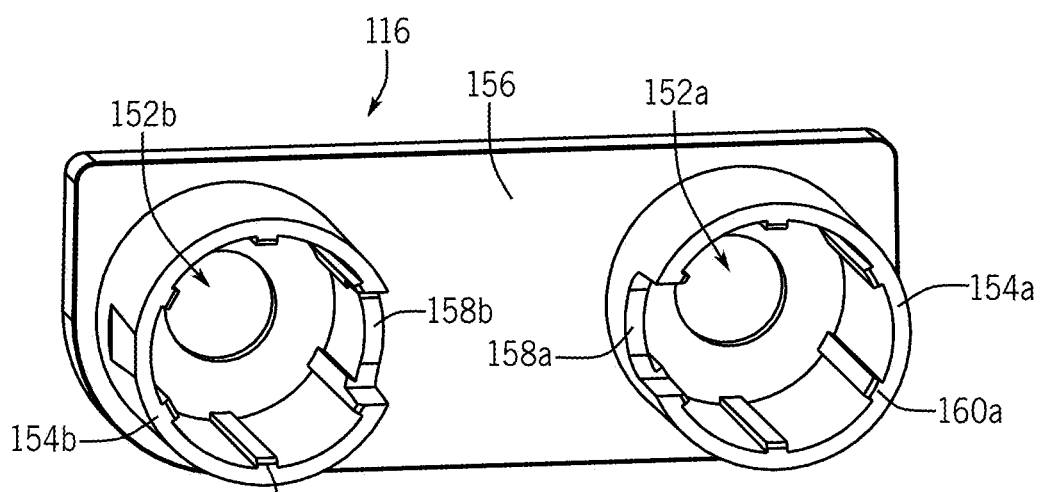
FIG. 4B is a rear perspective view of the plug face of FIG. 4A.

FIGS. 4A and 4B illustrate front and rear perspective views of the plug face 116. The plug face 116 defines a front or device-facing end of the charging connector 104. The plug face 116 may generally correspond to the shape of the plug body 118 and in one implementation may be shaped as a rectangular or trapezoidal member with rounded bottom edges corresponding to rounded bottom edges in the plug body 118. However, in other embodiments, the plug face 116 may be designed as desired. In one embodiment, the plug face 116 includes a front engagement surface 150 and a rear surface 156. The front engagement surface 150 may be shaped to match or mirror the shape of the device charging port 124 surface. For example, in instances where the charging port 124 includes a sloped or curved surface, the front engagement surface 150 may be shaped or sloped to mate with the charging port 124 surface. Similarly, the thickness of the plug face 116 extending between the front engagement surface 150 and the rear surface 156 may be selected based on a depth of the charging port 124.

One or more connector sleeves 154a, 154b or compartments extend from the rear surface 156. The connector sleeves 154a, 154b or retainers may be shaped to receive the magnetic elements 120a, 120b and/or conductive contacts 122a, 122b, e.g., shaped as cylindrical sleeves to receive round magnetic and conductive contacts. With reference to FIG. 4B, the connector sleeves 154a, 154b may include one or more retaining elements 160a, 160b to assist in holding the magnetic elements 120a, 120b and conductive contacts 122a, 122b. In one implementation, the retaining elements 160a, 160b may be formed as spaced apart longitudinal ribs that extend along a length of the connector sleeves 154a, 154b. In other implementations, the retaining elements 160a, 160b may be formed as tabs, annular raised ribs, or the like. Additionally, in other embodiments, the retaining elements 160a, 160b may be omitted and/or other forms of engagement or retaining may be used, such as a tight press fit, adhesive, or the like.

The connector sleeves 154a, 154b may also include recesses 158a, 158b or pass through features defined in the sidewalls thereof. In one embodiment, the recesses 158a, 158b are formed as lowered portions of the sidewalls that allows certain elements to electrically and mechanically connect with the cable 108.

One or more contact apertures 152a, 152b are defined through the front surface 150 of the plug face 116 to allow electrical connections to components received within the connector sleeves 154a, 154b. As one example, the contact apertures 152a, 152b may be circular apertures, but as can be appreciated the shape and diameter are variable based on the types, size, and current requirements of the electrically conductive contacts of the charging connector 104.

Figure 5A:
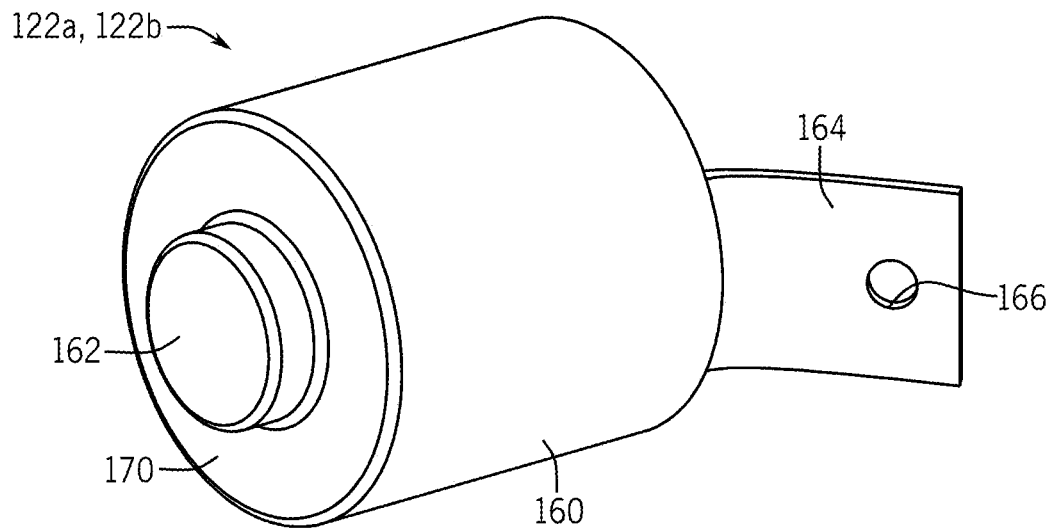
FIG. 5A is a perspective view of a conductive contact for the charging connector.
Figure 5B:
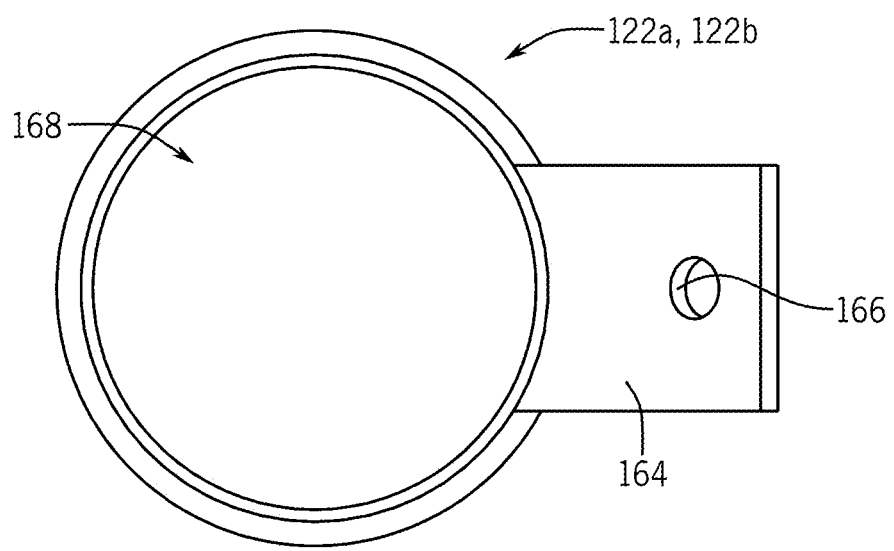
FIG. 5B is a rear elevation view of the conductive contact.

FIG. 5A illustrates a front perspective view of one of the conductive contacts 122a, 122b. FIG. 5B illustrates a rear view of one of the conductive contacts 122a, 122b. The conductive contacts 122a, 122b are configured to define an electrical connection between the cable 108 and the device 102. In one embodiment, the conductive contacts 122a, 122b may include a cylindrical body having a front surface 170 with a conductive pad 162 or nub extending from the front surface 170. In some embodiments, the thickness of the front surface 170 and/or thickness of the entire conductive contact 122a, 122b may be selected to allow a magnetic force to extend therethrough. The shape and extension of the conductive pad 162 varies based on the depth of the device charging port 124 and conductive contacts (e.g., pads, sleeves, or the like). As an example, in instances where the charging port 124 may include a conductive sleeve, the conductive pads 162 may be prongs that extend into the sleeves.

A back or rear end of the conductive contacts 122a, 122b may be open defining a hollow reception cavity 168. A cable contact tab 164 extends from a bottom edge of the conductive contacts 122a, 122b. The cable contact tab 164 may be include a mechanical connection element to allow a connection to the cable 108, e.g., a wire aperture 166 through which the conductive ends 136a, 136b are configured to be inserted. In other embodiments, the wire aperture 166 may be omitted and the wires may be configured to be wrapped around or press fig against the cable contact tab 164.

With reference again to FIGS. 2 and 3, the magnetic elements 120a, 120b are formed of a magnetic material and are configured to exert a magnetic force. In one embodiment, the first magnetic element 120a is configured within the plug 106 to exert a first force (e.g., north) and the second magnetic element 120b is configured within the plug 106 to exert a second force (e.g., south), i.e., the magnetic elements 120a, 120b may have opposite poles. The magnetic elements 120a, 120b may be shaped as desired, but in one embodiment are cylindrically shaped. The magnetic elements 120a, 120b may be magnets and the term magnetic element is meant to encompass both magnets, as well as other components that include magnetic materials.

With reference to FIGS. 2 and 3, the assembly of the charging connector 104 will be discussed. The magnetic elements 120a, 120b are received within the reception cavity 168 in the respective conductive contacts 122a, 122b. This type of connection allows the magnetic elements 120a, 120b to be aligned with the conductive contacts 122a, 122b such that a force exerted by the magnetic elements will be aligned with an axis of the conductive contacts 122a, 122b. In one example, the magnetic force of the magnetic elements 122a, 122b is oriented to be parallel to a center axis of the conductive contacts 122a, 122b, such that the force will assist in aligning the conductive contacts 122a, 122b with a center axis of a corresponding conductive contact of the charging port 124.

The conductive ends 136a, 136b of the wires 132a, 132b are connected to the conductive contacts 122a, 122b, e.g., the wires 132a, 132b are threaded into the respective wire apertures 166a, 166b of the conductive contacts 122a, 122b. The conductive contacts 122a, 122b are connected to the plug face 116. For example, the conductive contacts 122a, 122b may be received within the connector sleeves 154a, 154b and aligned such that the tabs 164 are aligned and positioned within the recesses 158a, 158b in the sleeve sidewalls. Additionally, the conductive pads 162 are aligned with the contact apertures 152a, 152b and received therethrough, such that the conductive pads 162 extend through the contact apertures 152a, 152b. In some embodiments, the contact pads 162 may remain flush with the engagement surface 150 of the plug face 116 or in other embodiments, such as shown in FIG. 3, the contact pads 162 extend past the engagement surface 150. In embodiments where the contact pads 162 extend past the engagement surface 150, they may provide a mechanical, as well as electrical connection, to the device port 124. The retaining elements 160a, 160b assist in retaining the conductive contacts 122a, 122b within the retaining sleeves 154a, 154b.

The plug body 118 may then be formed or otherwise connected to the plug face 116, conductive contacts 122a, 122b, and plug end 114 of the cable 108. For example, the material that will form the plug body 118 may be injected into a mold of the plug body 118 and flow around the various components, securing them together as it hardens, as well defining the shape of the plug body 118. In one embodiment, the strain relief 140 extends around the wires 132a, 132b and to the end of the plug end 114, e.g., extends to where the outer insulation layer of the cable 108 begins. In embodiments where the plug body 118 is formed in other processes, the various components of the plug 106 may be positioned within the formed plug body 118, e.g., housing shells or the like, and the plug body 118 may be secured together, e.g., ultrasonic welding, adhesive, fasteners, or the like.

Once the plug body 118 is connected, the cable 108 and the plug 106 are secured together and electrically connected to one another, allowing electrical current to be transferred from the wires 132a, 132b to the conductive contacts 122a, 122b. The cable connector 112 of the cable 108 may be inserted into the source port 130 to mechanically and electrically connect the cable 108 to the source block 110.

In operation, a user inserts the prongs 128a, 128b of the source block 110 into a power source, e.g., a wall outlet, to provide power to the charging connector 104. The user then connects the plug 106 to the corresponding device charging port 124. For example, the user aligns the conductive pads 162 of the conductive contacts 122a, 122b with corresponding conductive pads in the electrical contacts 126a, 126b in the charging port. As the user is orienting the plug 106, the magnetic elements 120a, 120b will assist in guiding the plug 106 to the conductive pads 126a, 126b, which also include magnetic elements, arranged in an opposite polarity as the charging connector 104. The opposite polarity of the magnetic elements 120a, 120b ensure that the charger connector 104 is aligned as desired, such that the first contact pad 160 of the first conductive contact 122a engages the first contact pad 126a of the charging port 124 and that the second contact pad 160 of the second conductive contact 122b engages the second contact pad 126b of the charging port 124. It should be understood, that the charging port 124 may include magnetic material, whereas the charging connector 104 may include magnets, which are attracted to the magnetic material and vice versa (i.e., the charging port 124 may include magnets and the charging connector 104 may include magnetic material), or in other instances, both the charging port 124 and the charging connector 104 may include the same types of magnetic elements, e.g., both magnets or both magnetic materials within another component.

Once connected, electricity will flow from the power source, into the source block 110, through the wires 132a, 132b in the cable 108, into the tabs 164 of the conductive contacts 122a, 122b and then into the corresponding contacts 126a, 126b of the charging port 124 to reach the desired location within the device 102.

When the device 102 is sufficiently charged or as otherwise desired by the user, the user can grip the plug body 118, which due to the material or configuration, may have an increased frictional surface, to assist a user in gripping the plug body 118. The user can then overcome the magnetic force exerted by the magnetic elements 122a, 122b and disconnect the charging connector 104 from the device 102. Such disconnection and in instances where the cable 108 also disconnects from the source block 110, increases the compactness of the oral health system 100, allowing it to be more portable.

All relative and directional references (including top, bottom, side, front, rear, and so forth) are given by way of example to aid the reader's understanding of the examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

The present disclosure teaches by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A charging connector comprising:
a cable configured to connect to a power source; and
a plug in electrical communication with the cable and configured to connect to a device, the plug comprising:
   a plug body;
   a first conductive contact in electrical communication with the cable;
   a second conductive contact in electrical communication with the cable;
   a first magnetic element received within the first conductive contact and having a first polarity; and
   a second magnetic element received within the second conductive contact and having a second polarity that is different from the first polarity;
wherein:
the first conductive contact defines a sleeve and the first magnetic element is received within the sleeve of the first conductive contact; and
the second conductive contact defines a sleeve and the second magnetic element is received within the sleeve of the second conductive contact.

2. The charging connector of claim 1, wherein the plug body comprises a friction enhancing surface to assist a user in grasping the plug body.

3. A charging connector comprising:
a cable configured to connect to a power source; and
a plug in electrical communication with the cable and configured to connect to a device, the plug comprising:
   a plug body;
   a first conductive contact in electrical communication with the cable;
   a second conductive contact in electrical communication with the cable;
   a first magnetic element received within the first conductive contact and having a first polarity; and
   a second magnetic element received within the second conductive contact and having a second polarity that is different from the first polarity;
wherein:
the first conductive contact includes a portion that extends past a front engagement face of the plug; and
the second conductive contact includes a portion that extends past the front engagement face of the plug.

4. The charging connector of claim 3, wherein:
the portion of the first conductive contact that extends past the front engagement face of the plug comprises a first contact nub; and
the portion of the second conductive contact that extends past the front engagement face of the plug comprises a second contact nub.

5. A charging connector comprising:
a cable configured to connect to a power source; and
a plug in electrical communication with the cable and configured to connect to a device, the plug comprising:
   a plug body;
   a first conductive contact in electrical communication with the cable;
   a second conductive contact in electrical communication with the cable;
   a first magnetic element received within the first conductive contact and having a first polarity; and
   a second magnetic element received within the second conductive contact and having a second polarity that is different from the first polarity;
wherein the plug body is overmolded onto the first conductive contact, the second conductive contact, the first magnetic element, and the second magnetic element.

6. A charging connector comprising:
a cable configured to connect to a power source; and
a plug in electrical communication with the cable and configured to connect to a device, the plug comprising:
   a plug body;
   a first conductive contact in electrical communication with the cable;
   a second conductive contact in electrical communication with the cable;
   a first magnetic element received within the first conductive contact and having a first polarity; and
   a second magnetic element received within the second conductive contact and having a second polarity that is different from the first polarity;
wherein the plug body is a thermoplastic elastomer material.

7. A charging connector comprising:
a cable configured to connect to a power source; and
a plug in electrical communication with the cable and configured to connect to a device, the plug comprising:
   a plug body;
   a first conductive contact in electrical communication with the cable;
   a second conductive contact in electrical communication with the cable;
   a first magnetic element received within the first conductive contact and having a first polarity; and
   a second magnetic element received within the second conductive contact and having a second polarity that is different from the first polarity;
wherein the plug further comprises a plug face coupled to the plug body, wherein the first conductive contact and the second conductive contact extend through the plug face for electrical connection with a charging port on the device.

8. A charging connector comprising:
a cable configured to connect to a power source; and
a plug in electrical communication with the cable and configured to connect to a device, the plug comprising:
   a plug body;
   a first conductive contact in electrical communication with the cable;
   a second conductive contact in electrical communication with the cable;
   a first magnetic element received within the first conductive contact and having a first polarity; and
   a second magnetic element received within the second conductive contact and having a second polarity that is different from the first polarity;

wherein the plug body defines a strain relief that is formed over a portion of the cable.

9. The charging connector of claim 8, wherein the strain relief is formed integrally with the plug body and is formed of the same material as the plug body.

10. A charging assembly for charging a device comprising:
- a cable configured to be electrically connected to a power source, the cable comprising:
  - a first wire; and
  - a second wire; and
- a plug connected to the cable, the plug comprising:
  - a first conductive contact in electrical communication with the first wire;
  - a first magnet received within the first conductive contact and having a first polarity;
  - a second conductive contact in electrical communication with the second wire; and
  - a second magnet received within the second conductive contact and having a second polarity.

11. The charging assembly of claim 10, further comprising a source block connected to the cable and comprising a pair of prongs to couple to the power source.

12. The charging assembly of claim 10, wherein the first magnet exerts a first magnetic force along a center axis of the first conductive contact and the second magnet exerts a second magnetic force along a center axis of the second conductive contact.

13. The charging assembly of claim 10, wherein:
the first conductive contact includes a first contact tab connected to the first wire; and
the second conductive contact includes a second contact tab connected to the second wire.

14. The charging assembly of claim 10, wherein:
the first conductive contact defines a cylindrical sleeve in which the first magnet is received; and
the second conductive contact defines a cylindrical sleeve in which the second magnet is received.

15. The charging assembly of claim 10, further comprising a plug body, wherein the plug body encloses at portion of the cable, a portion of the first conductive contact, a portion of the second conductive contact, a portion of the first magnet, and a portion the second magnet.

16. The charging assembly of claim 15, wherein the plug body is formed of a thermoplastic elastomer.

17. An oral irrigator system comprising:
an oral irrigator with a charging port, the charging port comprising:
  a first conductive contact; and
  a first magnetic element connected to the first conductive contact; and
a charging connector releasably connectable to the charging port, the charging connector comprising:
  a second conductive contact; and
  a second magnetic element connected to the second conductive contact;
wherein the first magnetic element and the second magnetic element have opposite magnetic poles.

18. The oral irrigator system of claim 17, wherein the charger connector further comprises:
a cable electrically connected to the second conductive contact; and
a source block electrically connected to the cable and configured to connect to a power source.

19. The oral irrigator system of claim 17, wherein the second magnetic element is received within the second conductive contact.

* * * * *